United States Patent
Harte

(10) Patent No.: US 9,662,780 B2
(45) Date of Patent: May 30, 2017

(54) DUST COLLECTION METHOD AND APPARATUS

(71) Applicant: Glenn W. Harte, Mesquite, NV (US)

(72) Inventor: Glenn W. Harte, Mesquite, NV (US)

(*) Notice: Subject to any disclaimer, the term of this patent is extended or adjusted under 35 U.S.C. 154(b) by 0 days.

(21) Appl. No.: 14/798,713

(22) Filed: Jul. 14, 2015

(65) Prior Publication Data
US 2016/0016303 A1    Jan. 21, 2016

Related U.S. Application Data

(60) Provisional application No. 62/025,134, filed on Jul. 16, 2014.

(51) Int. Cl.
*F16M 11/00* (2006.01)
*B25H 1/00* (2006.01)
*B60B 33/00* (2006.01)

(52) U.S. Cl.
CPC ........ *B25H 1/0042* (2013.01); *B60B 33/0089* (2013.01)

(58) Field of Classification Search
CPC .......... F16M 7/00; F16M 11/10; F16M 11/18; F16M 2200/08; F16M 11/42; F16M 2200/024; F16M 13/00; F16M 11/24; F16M 11/38; F16M 11/2014; F16M 2200/041; F16M 11/04; F16M 11/12; F16M 11/2021
USPC ....... 248/188.2, 188.5, 188.8, 649, 651, 653
See application file for complete search history.

(56) References Cited

U.S. PATENT DOCUMENTS

| | | | | |
|---|---|---|---|---|
| 3,288,250 A | * | 11/1966 | Oja | A61G 5/1029 188/5 |
| 3,422,929 A | * | 1/1969 | Oja | B62B 5/049 188/23 |
| 4,326,864 A | | 4/1982 | Sittler | |
| 5,046,748 A | * | 9/1991 | Oat-Judge | A61H 3/04 188/5 |
| 5,628,522 A | * | 5/1997 | Hall | B60B 33/06 280/43.14 |
| 5,882,155 A | | 3/1999 | Testa, Jr. | |
| 5,957,649 A | * | 9/1999 | English, Jr. | A47B 91/002 254/8 R |
| 6,106,203 A | | 8/2000 | Asmis et al. | |
| 6,183,527 B1 | | 2/2001 | O'Banion et al. | |
| 6,715,979 B1 | * | 4/2004 | Theising | A47B 91/002 248/647 |
| 6,783,563 B1 | | 8/2004 | Eckhoff et al. | |
| 7,374,184 B2 | * | 5/2008 | Worthy | B62B 5/049 280/43.1 |
| 7,584,935 B2 | * | 9/2009 | Chen | B25H 1/04 248/647 |
| 8,511,693 B2 | * | 8/2013 | Gass | B25H 1/04 280/43.14 |
| 2010/0303593 A1 | * | 12/2010 | Peacock | B62B 5/049 414/458 |

* cited by examiner

*Primary Examiner* — Steven Marsh
(74) *Attorney, Agent, or Firm* — Arthur Jacob

(57) ABSTRACT

An apparatus and method utilize a conventional portable shop vacuum to facilitate the collection of dust generated by a machine tool in a workshop. Selective translation of the machine tool along a workshop floor among chosen locations is enabled by virtue of casters provided by the shop vacuum. A selectively operated actuating mechanism renders the machine tool stationary at any one particular chosen location along the workshop floor.

15 Claims, 5 Drawing Sheets

DUST COLLECTION METHOD AND APPARATUS

This application claims the benefit of U.S. Provisional Patent Application Ser. No. 62/025,134 filed Jul. 16, 2014.

The present invention relates to collecting dust generated by machine tools, primarily in a woodworking shop, and pertains, more specifically to a machine support table adapted for integration with a conventional shop vacuum for establishing a selectively portable work station, while providing for the collection of dust at the selected location of the work station.

Many dust collection systems have been devised to cope with dust generated by machine-operated woodworking tools, such as table saws, miter saws, scroll saws, sanding machines, routers and the like utilized in woodworking shops. Most of these systems utilize a central, vacuum operated dust collection unit and require a relatively elaborate network of ducts leading from the central unit to the various stations where these machines are located. While such systems are quite effective, they are relatively expensive and require stations at fixed locations where the tools are more-or-less permanently installed.

Many small workshops, and especially those operated as home workshops, rely upon smaller, portable vacuums, known as shop vacuums, to sweep away dust generated by woodworking machines located at various locations around the shop. These shop vacuums usually incorporate wheels or casters for ease of movement from one location to another as they collect dust, after the fact. The present invention takes advantage of the portable nature of a conventional shop vacuum, as well as the dust collection capabilities of the vacuum, by integrating a woodworking machine with the vacuum so as to enable immediate effective dust collection while providing convenient portability for better utilization of the usually limited space available in small shops. As such, the present invention attains several objects and advantages, some of which are summarized as follows: Provides relatively small woodworking shops with the ability to collect dust immediately and directly from a variety of woodworking machines with ease and economy; enables convenient portability of a woodworking machine while providing effective collection of dust generated by the machine directly, when operated at any selected location; allows a woodworker to set up any one of a variety of machines at any selected location for convenience in operating the machine, while assuring effective dust collection, and allowing subsequent movement of the machine into a stored location, with increased ease; provides a relatively inexpensive way of keeping a small shop free of excessive dust, while promoting an efficient use of the space available in the shop; enables the use of a conventional portable shop vacuum for economical and effective dust collection in connection with a wide variety of woodworking machines, while providing such woodworking machines with convenient portability; provides a relatively rugged system, capable of exemplary performance over an extended service life.

The above objects and advantages, as well as further objects and advantages are attained by the present invention, which may be described briefly as apparatus for utilizing a conventional portable shop vacuum to facilitate the collection of dust generated by a machine tool in a workshop, to enable selective translation of the machine tool along a workshop floor among chosen locations by virtue of casters provided by the shop vacuum, and to render the machine tool stationary at any one particular chosen location along the workshop floor, the apparatus comprising: a frame; a support construct carried by the frame for mounting the machine tool on the frame; a coupling construct for coupling the frame with the shop vacuum, with the casters of the shop vacuum in place upon the workshop floor for translation of the frame and the mounted machine tool along the workshop floor; and an actuating mechanism carried by the frame for selectively precluding further translation of the machine tool mounted on the frame, along the workshop floor upon placement of the machine tool at one particular chosen location.

In addition, the present invention provides a method for utilizing a conventional portable shop vacuum to facilitate the collection of dust generated by a machine tool in a workshop, to enable selective translation of the machine tool along a workshop floor among chosen locations by virtue of casters provided by the shop vacuum, and to render the machine tool stationary at any one particular chosen location along the workshop floor, the method comprising: mounting the machine tool on a support construct on a frame of the apparatus; coupling the frame with the shop vacuum, with the casters of the shop vacuum in place upon the workshop floor for translation of the frame and the mounted machine tool along the workshop floor; and selectively precluding further translation of the machine tool mounted on the frame, along the workshop floor upon placement of the machine tool at one particular chosen location.

The invention will be understood more fully, while still further objects and advantages will become apparent, in the following detailed description of preferred embodiments of the invention illustrated in the accompanying drawing, in which.

Figure 1:
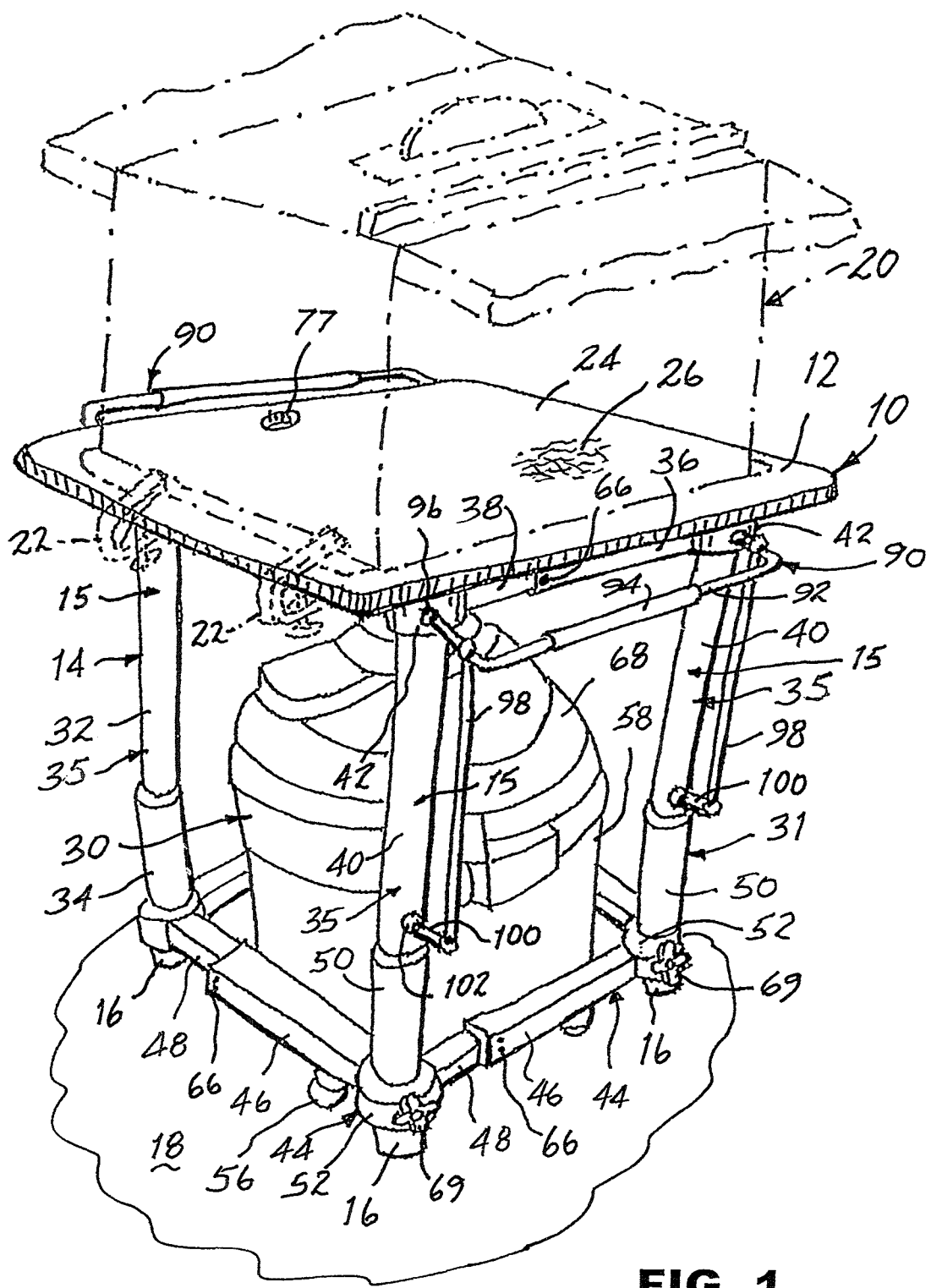
FIG. 1 is a front and right side pictorial view of an apparatus constructed and operated in accordance with the present invention.
Figure 2:
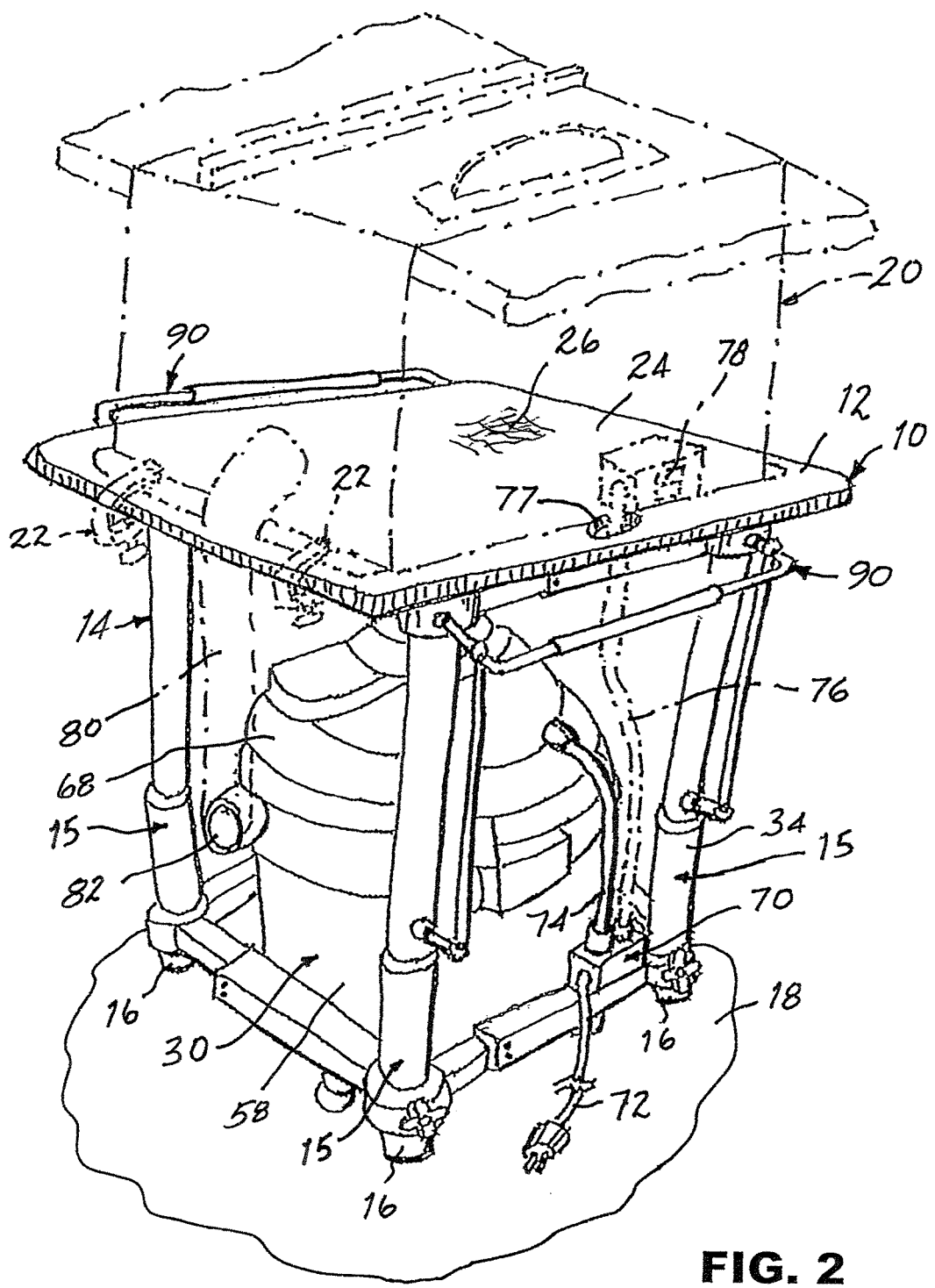
FIG. 2 is a rear and left side pictorial view of the apparatus.
Figure 3:
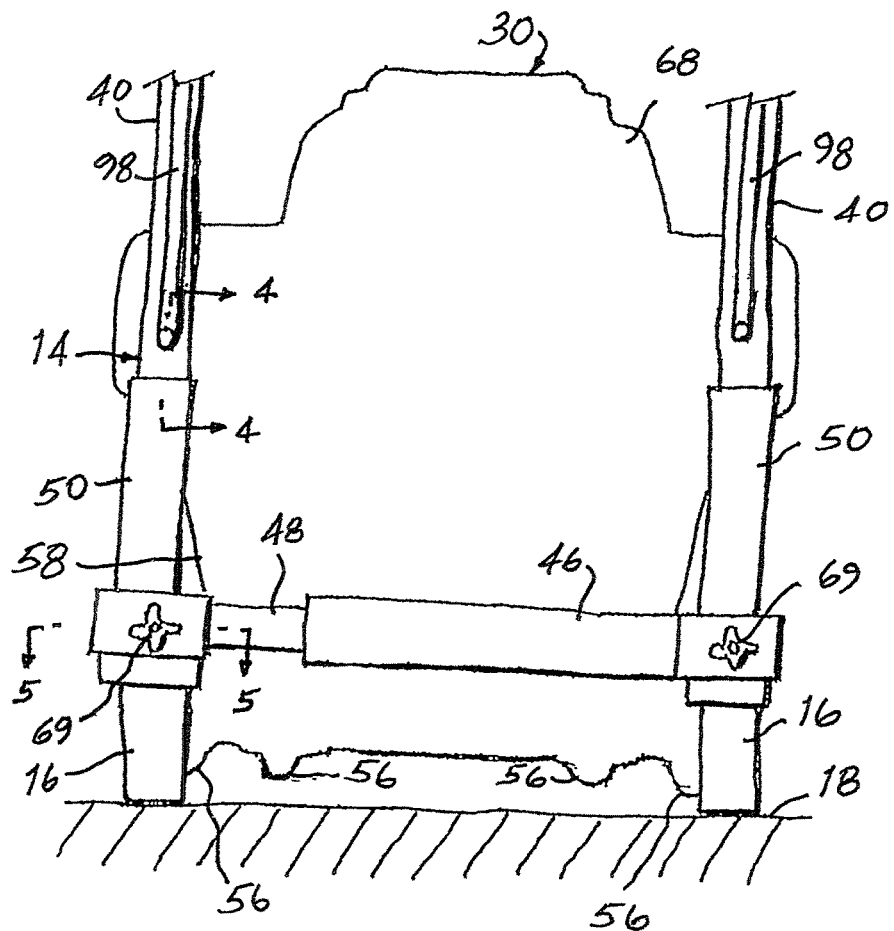
FIG. 3 is a somewhat diagrammatic fragmentary elevational view showing the apparatus in one mode of operation.

Referring now to the drawing, and especially to FIGS. 1 through 3 thereof, an apparatus constructed in accordance with the present invention is shown at 10 and is seen to include a table top 12 supported by a frame 14 which includes legs 15 depending from table top 12, and four feet 16 for supporting apparatus 10 on a surface 18, such as the floor of a woodworking shop. Table top 12 is dimensioned and configured to receive a woodworking machine, here shown in the form of a table saw, illustrated in phantom at 20, secured to the table top 12, as by clamps 22. Table top 12 and frame 14 have a strength and rigidity sufficient to assure that table saw 20 remains in place at the illustrated position on table top 12 during use of the table saw 20. In order to assure that table saw 20 does not move relative to table top 12, the top surface 24 of table top 12 may be provided with a rough texture 26. As an alternate to clamps 22, table saw 20 may be bolted or otherwise fastened to table top 12.

Figure 4:
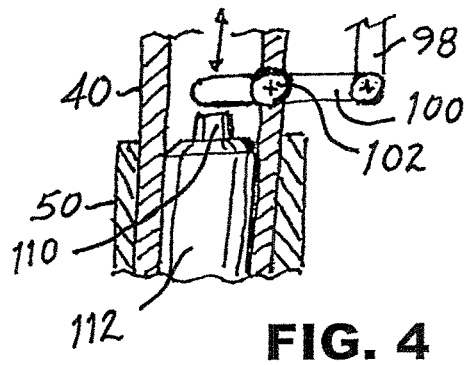
FIG. 4 is a fragmentary cross sectional view taken along line 4-4 of FIG. 2.

Frame 14 is constructed to be fitted over a conventional portable shop vacuum 30 and affixed to shop vacuum 30 to create an integrated unit 31 comprised of apparatus 10 and shop vacuum 30. In the preferred construction, frame 14 comprises an upper section 32 and a lower section 34. Upper section 32 includes four parts 35, each part 35 having horizontal transverse members 36 and 38 extending perpendicular to one-another beneath table top 12, and a mutually perpendicular upper leg segment 40 integrated with the horizontal transverse members 36 and 38 at a junction 42, with each leg segment 40 depending downward from a corresponding junction 42. In a similar manner, lower section 34 includes four parts 44, each part 44 having horizontal transverse members 46 and 48 extending perpendicular to one-another, and a mutually perpendicular lower leg segment 50 integrated with the horizontal transverse members 46 and 48 at a junction 52, with each leg segment 50 projecting upward from a corresponding junction 52. In order to accommodate the dimensions of a particular shop vacuum 30, which dimensions can vary among currently available conventional shop vacuums, horizontal transverse members 36 receive horizontal transverse members 38 in telescopic engagement, enabling an adjustment in the transverse length provided by interengaged members 36 and 38 and, likewise, horizontal transverse members 46 receive horizontal transverse members 48 in telescopic engagement, enabling adjustment of the transverse length provided by integrated members 46 and 48. Thus, in fitting apparatus 10 to selected conventional shop vacuum 30, all four parts 44 are placed in surrounding juxtaposition with tank 58 of shop vacuum 30, with the four parts 44 joined together by telescopically engaging corresponding horizontal transverse members 46 and 48, such that the depending legs 15 are located in an array fitted over and around shop vacuum 30. Then, with feet 16 in one position, extended and resting firmly on surface 18, and with shop vacuum 30 raised above surface 18 so that the casters 56 of shop vacuum 30 are raised so as to be spaced away from surface 18, as seen in FIG. 3, tank 58 is secured to lower section 34, as by self-sealing screws 60 spaced circumferentially around tank 58 and passed through the wall 62 of tank 58 and into lower section 34, as seen in FIG. 4, with seal 64 of each sealing screw 60 assuring that the integrity of the interior of tank 58 is not breached. Telescopically engaged members 36 and 38, and telescopically engaged members 46 and 48 may be fixed in the respective adjusted positions by screws 66.

Once tank 58 is affixed to lower section 34, cap 68 of shop vacuum 30 is joined with tank 58 to close shop vacuum 30, rendering shop vacuum 30 ready for use. Then, all four parts 35 of upper section 32 are joined together by telescopically engaging corresponding horizontal transverse members 36 and 38 until the horizontal spacing between depending leg segments 40 matches the horizontal spacing between projecting leg segments 50 of lower section 34, and table top 12 is affixed to upper section 32, as by fasteners (not shown). Leg segments 50 are tubular so that leg segments 40 are inserted into leg segments 50 until leg segments 40 are fully seated within leg segments 50, and table top 12 is placed at a convenient working height of approximately thirty-two inches, which table height provides sufficient clearance for accommodating the range of heights found in conventional shop vacuums. Set screws 69 may be employed to secure together upper and lower sections 32 and 34.

With feet 16 firmly located on surface 18, apparatus 10 is in place for operation of table saw 20. As best seen in FIG. 2, a controller 70 is carried by lower section 34 and includes a line cord 72 for connection to a source of power (not shown). Controller 70 provides receptacles for connecting the power cord 74 of shop vacuum 30, and for connecting the power cord 76 of table saw 20, which power cord 76 conveniently is passed through opening 77 in table top 12. Upon commencing operation of table saw 20, by actuating power switch 78, controller 70 will activate shop vacuum 30, and dust generated by table saw 20 will be drawn immediately and directly from table saw 20, through dust hose 80, and into shop vacuum 30 through an inlet 82 to tank 58. Preferably, controller 70 is constructed to continue activation of shop vacuum 30 for a limited duration, preferably for a brief period of about fifteen seconds after operation of table saw 20 is discontinued, in order to assure thorough collection of dust by shop vacuum 30. When it is desired to remove dust from shop vacuum 30, set screws 69 are operated to release the connection between upper and lower sections 32 and 34, and upper section 32, with table top 12, is lifted away from lower section 34, thereby enabling access to shop vacuum 30 for removal of cap 68 and emptying of tank 58.

Figure 6:
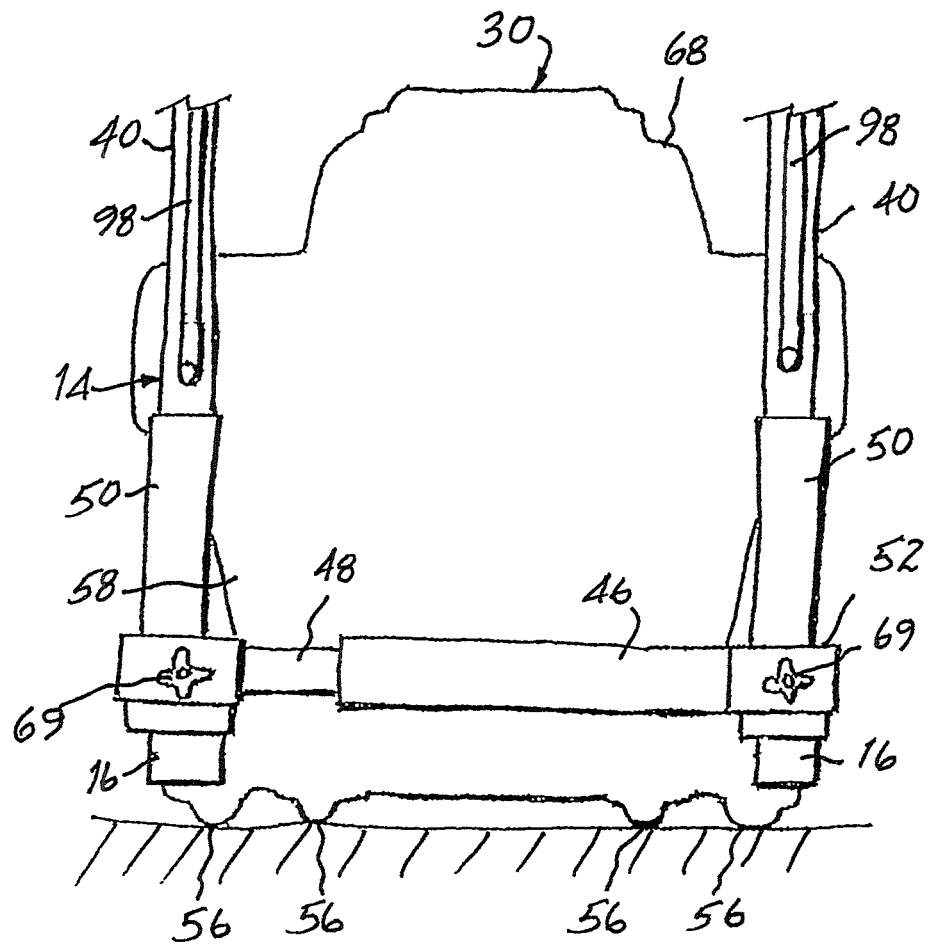
FIG. 6 is a somewhat diagrammatic fragmentary elevational view similar to FIG. 3, and showing the apparatus in another mode of operation.

When it is desired to move table saw 20 to another location, perhaps for temporary storage, an actuating mechanism, shown in the form of lift mechanism 90, is provided for retracting feet 16 into another position, within lower section 34, thereby lowering frame 14, and consequently unit 31, and bringing the casters 56 of shop vacuum 30 into engagement with surface 18, as seen in FIG. 6. With the casters 56 engaging surface 18, and feet 16 so retracted, the entire unit 31 may be rolled on casters 56 to any selected location. Once at the selected location, lift mechanism 90 is actuated once again to extend feet 16 into engagement with surface 18, thereby raising unit 31, and casters 56, to maintain unit 31 at the selected location.

Figure 5:
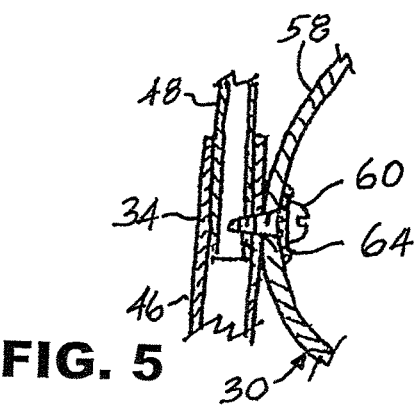
FIG. 5 is an enlarged fragmentary cross-sectional view taken along line 5-5 of FIG. 3.

With reference to FIGS. 5 and 6, as well as to FIGS. 1 and 2, lift mechanism 90 comprises an actuator, shown in the form of lift bar 92, mounted at each side of frame 14, lift bars 92 each including a telescopically engaged lift section 94 that accommodates the telescopic adjustment of the distance between corresponding leg segments 40. Each lift bar 92 is mounted upon a corresponding junction 42 for pivotal movement at pivot 96 to selectively raise or lower a connector bar 98 which, in turn, pivots an actuator lever 100 about a pivot 102. As best seen in FIG. 5, leg segments 40 are tubular and each actuator lever 100 extends into a corresponding leg segment 40 to be juxtaposed with the actuator button 110 of a conventional, commercially available gas cylinder lift 112 which, in turn, is coupled to a corresponding foot 16. Thus, upon lifting each lift bar 92, each gas cylinder lift 112 will be actuated to retract each corresponding foot 16 to lower shop vacuum 30 so as to bring casters 56 into engagement with surface 18 for movement of unit 31 along surface 18. Upon lifting each lift bar 92, while at the same time lifting frame 14 to lift casters 56 away from surface 18, gas cylinder lifts 112 will extend feet 16 to maintain unit 31 in place.

Figure 7:
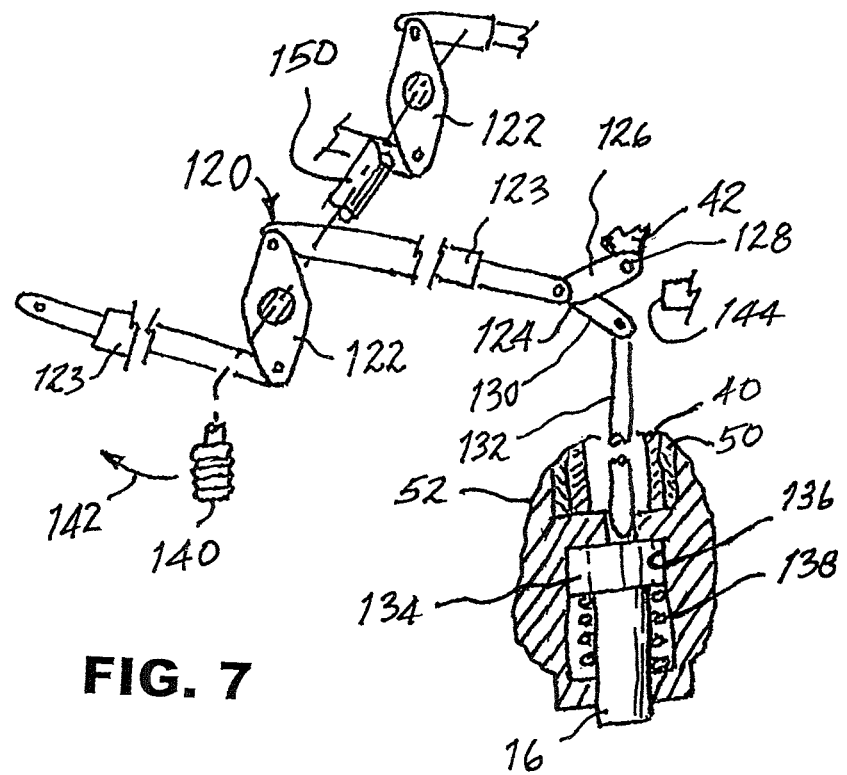
FIG. 7 is a diagrammatic view of an alternate arrangement of component parts of the apparatus in one mode of operation.
Figure 8:
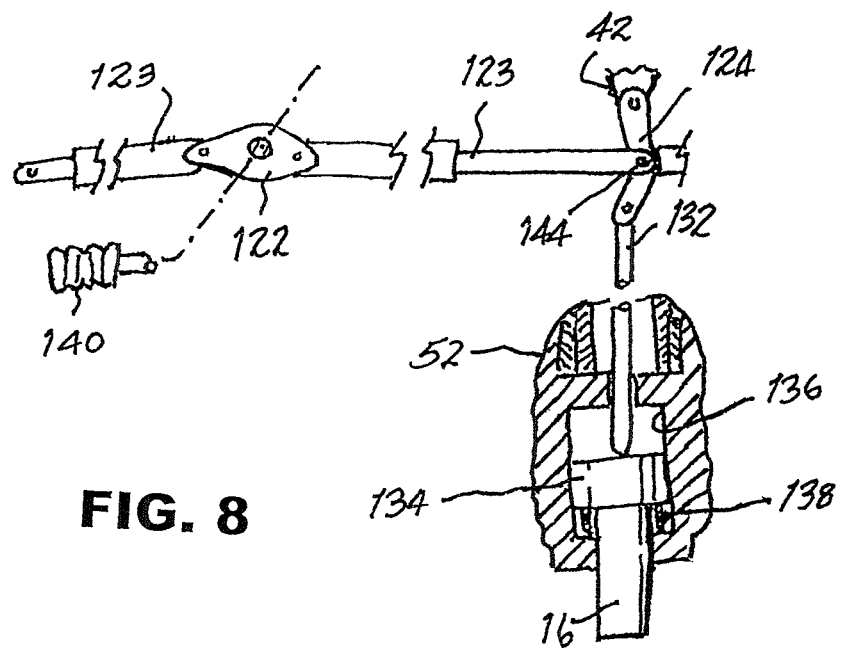
FIG. 8 is a diagrammatic view similar to FIG. 7 and showing the component parts in another mode of operation.

Turning now to FIGS. 7 and 8, there is illustrated diagrammatically an alternate lift mechanism 120. A crank 122 is mounted at each side of frame 14, at upper frame section 32, for rotation about an axis of rotation extending perpendicular to each side of frame 14. Crank 122 is coupled, by a telescopically adjustable connecting rod 123, to a toggle link assembly 124 placed at each junction 42. Upper link 126 of toggle link assembly 124 is pivoted about a fixed pivot point 128, while lower link 130 is coupled to a push-rod 132 that extends downward, through leg segments 40 and 50, to engage a flange 134 of a corresponding foot 16. Flange 134 is engaged within a bore 136 in junction 52 for up and down sliding movement within bore 136, and a helical spring 138 biases flange 134, and consequently foot 16, into the upper position seen in FIG. 7, corresponding to the retracted position of foot 16, shown in FIG. 6. A crank handle 140 is carried by crank 122 so that upon rotation of crank handle 140 in the direction of arrow 142 in FIG. 7, toggle link assembly 124 is moved toward an over-center position, illustrated in FIG. 8, moving push-rod 132 downward to drive flange 134 downward against the bias of helical spring 138 and thereby move foot 16 into the extended position seen in FIG. 3. Once in the over-center position, toggle link assembly 124 engages a stop surface 144 and is locked in place, by virtue of the bias of helical spring 138.

Upon rotation of crank handle 140 back to the position illustrated in FIG. 7, foot 16 once again is retracted, by the bias of helical spring 138, to enable lowering of unit 31 until casters 56 can once again roll along surface 18. While FIGS. 7 and 8 show the lift arrangement completed for only one foot 16, it is to be understood that the lift arrangement is repeated at each foot 16, with crank handle 140 coupled to a crank 122 at each side of frame 14, as by a crank shaft 150, for operating each of four toggle link assemblies, each associated with a corresponding foot 16.

It will be seen that the present invention attains all of the objects and advantages summarized above, namely: Provides relatively small woodworking shops with the ability to collect dust immediately and directly from a variety of woodworking machines with ease and economy; enables convenient portability of a woodworking machine while providing effective collection of dust generated by the machine directly, when operated at any selected location; allows a woodworker to set up any one of a variety of machines at any selected location for convenience in operating the machine, while assuring effective dust collection, and allowing subsequent movement of the machine into a stored location, with increased ease; provides a relatively inexpensive way of keeping a small shop free of excessive dust, while promoting an efficient use of the space available in the shop; enables the use of a conventional portable shop vacuum for economical and effective dust collection in connection with a wide variety of woodworking machines, while providing such woodworking machines with convenient portability; provides a relatively rugged system, capable of exemplary performance over an extended service life.

It is to be understood that the above detailed description of preferred embodiments of the invention is provided by way of example only. Various detail of design, construction and procedure may be modified without departing from the true spirit and scope of the invention, as set forth in the appended claims.

The embodiments of the invention in which an exclusive property or privilege is claimed are defined as follows:

1. Apparatus for utilizing a conventional portable shop vacuum to facilitate collecting dust generated by a machine tool in a workshop, to enable selective translation of the machine tool along a workshop floor among chosen locations by virtue of casters provided by the shop vacuum, and to render the machine tool stationary at any one particular chosen location along the workshop floor, the apparatus comprising:

a frame;

a support construct carried by the frame for mounting the machine tool on the frame;

a coupling construct carried by the frame for coupling the shop vacuum with the frame, the coupling construct being dimensioned, configured and so located on the frame as to be adapted to receive and position the shop vacuum with the casters of the shop vacuum in place upon the workshop floor for operation of the casters to enable selective translation of the frame and the mounted machine tool along the workshop floor; and an actuating mechanism carried by the frame, the actuating mechanism being selectively actuated to preclude said operation of the casters, thereby selectively disabling translation of the frame and precluding further translation of the machine tool mounted on the frame, along the workshop floor upon placement of the machine tool at one particular chosen location.

2. The apparatus of claim 1 including:

a plurality of feet carried by the frame for displacement between a first position, wherein the feet are retracted away from the workshop floor and the casters are engaged with the workshop floor for enabling translation of the machine tool among the chosen locations, and a second position, wherein the feet are advanced for engaging the workshop floor to preclude movement of the machine tool away from the one particular chosen location; and the actuating mechanism includes an actuator coupled with the feet for selective displacement of the feet between the first position and the second position.

3. The apparatus of claim 2 wherein:

the frame comprises an upper section and a lower section;

the coupling construct is placed in the lower section for coupling the lower section with the shop vacuum; and the upper section is selectively movable relative to the lower section for selective access to a coupled shop vacuum.

4. The apparatus of claim 1 wherein:

the support construct includes a table top for receiving the machine tool; and the frame includes a plurality of legs depending from the table top and located in an array for being fitted over and around the shop vacuum, thereby to accommodate reception of the shop vacuum within the frame.

5. The apparatus of claim 4 including:

a plurality of feet, each carried by a respective corresponding leg of the frame for displacement between a first position, wherein the feet are retracted away from the workshop floor for engagement of the casters with the workshop floor, enabling translation of the machine tool among the chosen locations, and a second position, wherein the feet are advanced for engaging the workshop floor to preclude movement of the machine tool away from the one particular chosen location; and the actuating mechanism comprises an actuator coupled with the feet for selective displacement of the feet between the first position and the second position.

6. The apparatus of claim 5 wherein:

the frame includes an upper section and a lower section;

each leg includes an upper leg segment within the upper section of the frame, and a lower leg segment within the lower section of the frame;

each one of the plurality of feet is carried by a corresponding lower leg segment;

the coupling construct is placed in the lower section for coupling the lower section with the shop vacuum; and the upper section is selectively movable relative to the lower section for selective access to a coupled shop vacuum.

7. The apparatus of claim 4 wherein the frame includes transverse members interconnecting corresponding legs, the transverse members being adjustable in transverse length to accommodate reception of a shop vacuum to be surrounded by the array of legs of the frame.

8. The apparatus of claim 7 including:
a plurality of feet, each carried by a respective corresponding leg of the frame for displacement between a first position, wherein the feet are retracted away from the workshop floor for engagement of the casters with the workshop floor, enabling translation of the machine tool among the chosen locations, and a second position, wherein the feet are advanced for engaging the workshop floor to preclude movement of the machine tool away from the one particular chosen location; and
the actuating mechanism comprises an actuator coupled with the feet for selective displacement of the feet between the first position and the second position.

9. The apparatus of claim 8 wherein:
the frame includes an upper section and a lower section;
each leg includes an upper leg segment within the upper section of the frame, and a lower leg segment within the lower section of the frame;
each one of the plurality of feet is carried by a respective corresponding lower leg segment;
the coupling construct is placed in the lower section for coupling the lower section with the shop vacuum; and
each upper leg segment is selectively movable relative to a respective corresponding lower leg segment for selective access to a coupled shop vacuum.

10. The apparatus of claim 9 including:
upper transverse members interconnecting corresponding upper leg segments; and
lower transverse members interconnecting corresponding lower leg segments;
the upper and lower transverse members each being adjustable in transverse length to accommodate reception of a shop vacuum to be surrounded by the array of legs of the frame.

11. Apparatus for utilizing a conventional portable shop vacuum to facilitate collecting dust generated by a machine tool in a workshop, to enable selective translation of the machine tool along a workshop floor among chosen locations by virtue of casters provided by the shop vacuum, and to render the machine tool stationary at any one particular chosen location along the workshop floor, the apparatus comprising:
a frame;
a support construct carried by the frame for mounting the machine tool on the frame;
a coupling construct for coupling the frame with the shop vacuum, with the casters of the shop vacuum in place upon the workshop floor for translation of the frame and the mounted machine tool along the workshop floor;
an actuating mechanism carried by the frame for selectively precluding further translation of the machine tool mounted on the frame, along the workshop floor upon placement of the machine tool at one particular chosen location; and
a controller mounted on the frame for controlling operation of the machine tool and a coupled shop vacuum, the controller being configured to operate the coupled shop vacuum for a brief period following discontinuance of the operation of the machine tool.

12. A method for utilizing a conventional portable shop vacuum to facilitate collecting dust generated by a machine tool in a workshop, to enable selective translation of the machine tool along a workshop floor among chosen locations by virtue of casters provided by the shop vacuum, and to render the machine tool stationary at any one particular chosen location along the workshop floor, the method comprising:
mounting the machine tool on a support construct on a frame of the apparatus;
coupling the frame with the shop vacuum, with the casters of the shop vacuum in place upon the workshop floor for translation of the frame and the mounted machine tool along the workshop floor; and
selectively precluding further translation of the machine tool mounted on the frame, along the workshop floor upon placement of the machine tool at one particular chosen location.

13. The method of claim 12 including:
providing a plurality of feet carried by the frame for displacement between a first position, wherein the feet are retracted away from the workshop floor, for engagement of the casters with the workshop floor to enable translation of the machine tool among the chosen locations, and a second position, wherein the feet are advanced for engaging the workshop floor to preclude movement of the machine tool away from the one particular chosen location; and
selectively displacing the feet between the first position and the second position.

14. The method of claim 13 including:
providing the frame with an upper section movable relative to a lower section;
coupling the lower section with the shop vacuum; and
moving the upper section relative to the lower section to gain selective access to the coupled shop vacuum.

15. The method of claim 12 including controlling operation of the machine tool and the coupled shop vacuum such that operation of the coupled shop vacuum is continued for a brief period following discontinuance of the operation of the machine tool.

* * * * *